No. 790,918. PATENTED MAY 30, 1905.
F. I. DU PONT.
APPARATUS FOR THE MANUFACTURE OF STRIPS OF EXPLOSIVE POWDER.
APPLICATION FILED JUNE 10, 1903.

WITNESSES:
W. H. Leanby
M. M. Hamilton

INVENTOR
Francis I. du Pont
BY
Henderson & Henderson
ATTORNEYS

No. 790,918. Patented May 30, 1905.

UNITED STATES PATENT OFFICE.

FRANCIS I. DU PONT, OF WILMINGTON, DELAWARE.

APPARATUS FOR THE MANUFACTURE OF STRIPS OF EXPLOSIVE POWDER.

SPECIFICATION forming part of Letters Patent No. 790,918, dated May 30, 1905.

Application filed June 10, 1903. Serial No. 160,805.

*To all whom it may concern:*

Be it known that I, FRANCIS I. DU PONT, a citizen of the United States, residing at Wilmington, in the county of Newcastle and State of Delaware, have invented a new and useful Improvement in Apparatus for the Manufacture of Strips of Explosive Powder, of which the following is a full, clear, and exact description, reference being had to the accompanying drawings, which form a part of this specification.

Heretofore the method of manufacturing strips or rods of explosive powder—as, for instance, smokeless powder—has been to force the powder in a plastic condition through a die. With this method there is a tendency for the strips to flow faster on one side than the other, and consequently to come out crooked. It also produces a rod or strip having a decided grain, which causes the material to break more easily in one direction than in another. I have discovered that if instead of causing the passage of the plastic material from the opening alone by pressure applied behind the plastic material I place at the mouth of the opening a pair of rolls turned down at this point to a less diameter than the contiguous parts of the rolls, leaving a space of desired thickness between the rolls and forming with the opening a laterally-closed passage and apply only sufficient pressure behind the plastic material to feed or force it to the space between the rolls the material will be delivered in even strips and without substantial grain.

The term "grain" used by me in this specification is used to indicate a peculiarity similar to the grain in wood.

I will first describe the apparatus illustrated in the accompanying drawings for carrying out my improved process.

Figure 1:
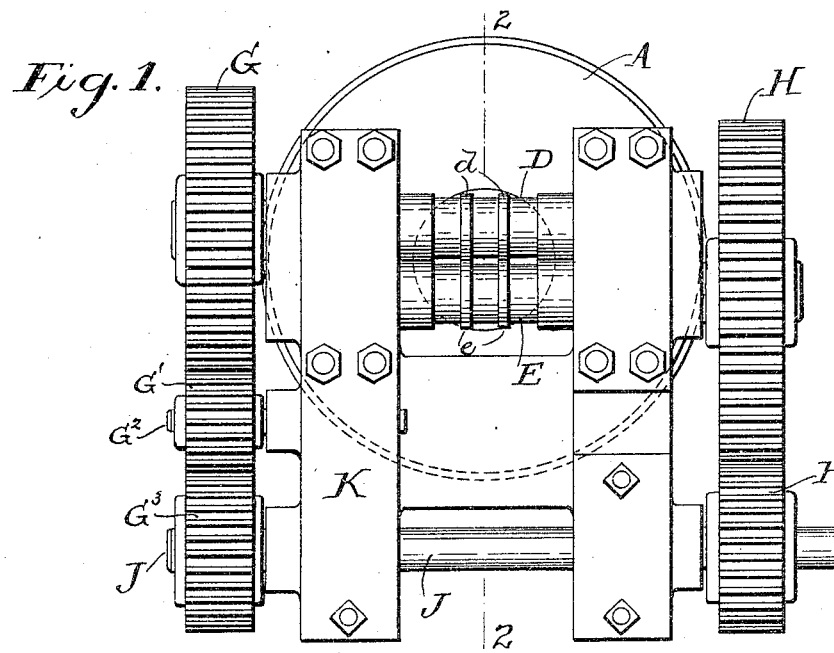
Figure 2:
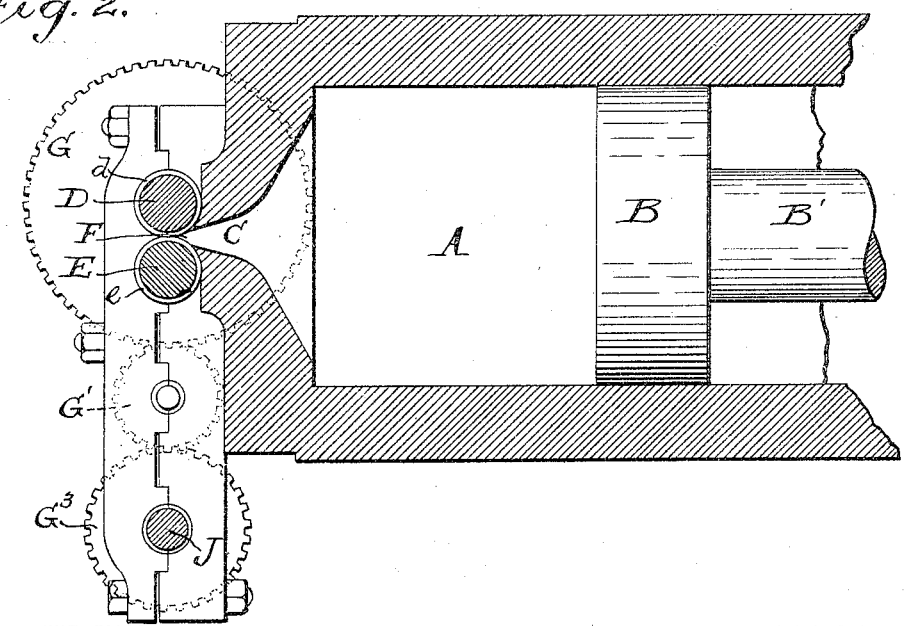

In the drawings, Figure 1 is a front elevation of my invention. Fig. 2 is a section on line 2 2, Fig. 1.

A is a cylinder; B, a piston in said cylinder; B', the piston-rod. The piston may be operated by any well-known means. (Not shown.) A cylinder A at the end in front of the piston B has an opening. In this opening is placed the nozzle C, having the opening F. The ends of this nozzle are formed to fit to the side walls $d$ and $e$ of the rolls D and E at the portion turned down for a less diameter to allow a certain definite thickness of strip to be made, and the opening F is at the point of the opening or space between the rolls. The shaft of roll D has the gear G, driven by the gear G', supported on the stud or shaft $G^2$, projecting from the housing K. This gear G' in turn is driven by the gear $G^3$ on the driving-shaft J. The driving-shaft is rotated by any well-known means. The shaft of the roll E has the gear H, driven by the gear H' on the shaft J. The two gears G and H are driven from the shaft J at the same rate of speed.

In carrying out my invention the explosive powder in plastic condition is placed in the cylinder A. Power is applied to the piston B, which forces the plastic material through the nozzle C and opening F to the space formed by the opening between the rolls, the material being confined from lateral movement by the walls $d$ and $e$ and the sides of the funnel. The pressure, however, which is applied is not sufficient to force the powder through the opening between the rolls. When the rolls are set in motion, the pressure being sufficient to feed the plastic powder between the rolls, the rolls will carry it along, rolling it into a strip or strips of thickness dependent upon the depth of the grooves in the rolls. The rolls compress the strip in the direction of its thickness. The cylinder piston and nozzle enable with proper applied pressure the plastic powder to be fed between the rolls, while the rolls form it into an even strip and compress it to the desired thickness without resultant grain.

Having now fully described my invention, what I claim, and desire to protect by Letters Patent, is—

1. In a machine for producing strips of explosive powder, in combination, a cylinder in which the powder in a plastic condition is adapted to be placed, a pair of abutting rolls, means to revolve the rolls in unison at the same speed, there being a portion of each roll of less diameter than the contiguous portion on each side, forming an opening between the rolls closed at the sides, an opening in the cylinder connecting with said opening between the rolls, and means to force the plastic powder out of the opening in the cylinder into the opening between the rolls.

2. In a machine for producing strips of explosive powder, in combination, a cylinder in which the powder in a plastic condition is adapted to be placed, a pair of abutting rolls, means to revolve the rolls in unison at the same speed, there being a portion of each roll of less diameter than the contiguous portion on each side, forming an opening between the rolls closed at the sides, an opening in the cylinder, a nozzle in said opening, said nozzle extending to the opening between the rolls and bent around the side walls of the turned-down portion of the rolls, and means to force the plastic powder through the nozzle.

3. In a machine for producing strips of explosive powder, in combination, a cylinder in which the powder in a plastic condition is adapted to be placed, a pair of abutting rolls, means to revolve the rolls in unison at the same speed, there being a portion of each roll of less diameter than the contiguous portion on each side, forming an opening between the rolls closed at the sides, an opening in the cylinder, a nozzle in said opening, said nozzle having pointed ends projecting in between the rolls, and means to force the plastic powder through the nozzle.

In testimony of which invention I have hereunto set my hand, at Wilmington, on this 8th day of June, 1903.

FRANCIS I. DU PONT.

Witnesses:
   CLIFFORD V. MANNERING,
   R. J. COYLE.